(12) United States Patent
Inoue

(10) Patent No.: US 8,773,574 B2
(45) Date of Patent: *Jul. 8, 2014

(54) IMAGE PICKUP APPARATUS HAVING IMPROVED CONTRAST AUTOFOCUS ACCURACY

(75) Inventor: Koji Inoue, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/556,707

(22) Filed: Jul. 24, 2012

(65) Prior Publication Data

US 2012/0287330 A1 Nov. 15, 2012

Related U.S. Application Data

(63) Continuation of application No. 12/789,971, filed on May 28, 2010, now Pat. No. 8,264,592.

(30) Foreign Application Priority Data

Jun. 5, 2009 (JP) ................................ 2009-136313

(51) Int. Cl.
  *G03B 13/00* (2006.01)
  *H04N 5/232* (2006.01)
(52) U.S. Cl.
  USPC ........................... 348/353; 348/345; 396/104
(58) Field of Classification Search
  USPC ................ 348/355, 345, 222.1, 353; 396/104
  See application file for complete search history.

(56) References Cited

U.S. PATENT DOCUMENTS

| 2004/0141184 | A1 | | 7/2004 | Ueki | |
| 2007/0030381 | A1 | * | 2/2007 | Maeda | 348/345 |
| 2008/0259202 | A1 | * | 10/2008 | Fujii | 348/345 |
| 2009/0034955 | A1 | * | 2/2009 | Kunishige et al. | 396/128 |
| 2009/0115882 | A1 | * | 5/2009 | Kawarada | 348/340 |
| 2010/0194967 | A1 | * | 8/2010 | Amano | 348/345 |
| 2010/0302433 | A1 | * | 12/2010 | Egawa | 348/345 |

FOREIGN PATENT DOCUMENTS

| CN | 101350887 A | 1/2009 |
| JP | 2001-255451 A | 9/2001 |
| JP | 2005-141068 A | 6/2005 |
| JP | 2007-233034 A | 9/2007 |
| JP | 2008-309882 A | 12/2008 |

OTHER PUBLICATIONS

The above foreign patent document and U.S. Patent Application were cited in a Apr. 30, 2014 Chinese Office Action, a copy of which is enclosed with an English Translation, that issued in Chinese Patent Application No. 201210211819.3.

* cited by examiner

*Primary Examiner* — Paul Berardesca
(74) *Attorney, Agent, or Firm* — Cowan, Liebowitz & Latman, P.C.

(57) ABSTRACT

An image pickup apparatus includes an image pickup device that includes a plurality of focus detection pixels, a phase difference detection type of a first focus detector, a contrast detection type of a second focus detector, and a controller. The controller is configured to allow the second focus detector to continue the focus detection when the shift amount detected by the first focus detector is larger than a threshold even when the second focus detector detects the lens position corresponding to the peak of the contrast value, and to move the image pickup lens to a lens position that provides a peak of a contrast value detected by the second focus detector when the shift amount is the threshold or smaller.

6 Claims, 2 Drawing Sheets

IMAGE PICKUP APPARATUS HAVING IMPROVED CONTRAST AUTOFOCUS ACCURACY

CROSS-REFERENCE TO RELATED APPLICATIONS

This application is a continuation of application Ser. No. 12/789,971, filed May 28, 2010 the entire disclosure of which is hereby incorporated by reference.

BACKGROUND OF THE INVENTION

1. Field of the Invention

The present invention relates to an image pickup apparatus, such as a digital camera and a digital video camera.

2. Description of the Related Art

Japanese Patent Laid-Open No. ("JP") 2003-295047 proposes a hybrid focus detection unit for moving a focus lens to a position near an on-focus position using an autofocus unit of a phase difference detection method ("phase difference AF"), and then for precisely moving the focus lens to the on-focus position using an autofocus unit of a contrast detection method ("contrast AF"). JP 2009-003122 realizes a phase difference detection function by providing an image pickup device with a focus detection pixel.

However, the contrast AF has a problem in that a high contrast background in a focus detection region increases a contrast and causes an erroneous detection of this contrast change (which will be referred to as a "false peak" hereinafter) as an on-focus position. In addition, a noise ratio at the image pickup time increases as the ISO sensitivity increases, and the false peak is detected due to the noises. Hence, there is a demand for improved contrast AF accuracy or ultimately the hybrid AF accuracy.

SUMMARY OF THE INVENTION

The present invention provides an image pickup device having improved autofocus accuracy of the contrast detection method.

An image pickup apparatus according to one aspect of the present invention includes an image pickup device that includes a plurality of image pickup pixels each configured to receive light that has passed an exit pupil of an image pickup lens and to generate an image of an object, and a plurality of focus detection pixels each configure to receive light that has passed a part of an area of the exit pupil of the image pickup lens, a first focus detector configured to detect a focus by detecting a shift amount between a pair of images of the object formed by the plurality of focus detection pixels, a second focus detector configured to detect a focus by detecting a lens position corresponding to a peak of a contrast value of an image of the object formed by the plurality of image pickup pixels, and a controller configured to allow the second focus detector to continue to detect the focus when the shift amount detected by the first focus detector is larger than a threshold even when the second focus detector detects the lens position corresponding to the peak of the contrast value, and to move the image pickup lens to the lens position corresponding to the peak of the contrast value detected by the second focus detector when the shift amount is the threshold or smaller.

Further features of the present invention will become apparent from the following description of exemplary embodiments with reference to the attached drawings.

DESCRIPTION OF THE EMBODIMENTS

Figure 1:
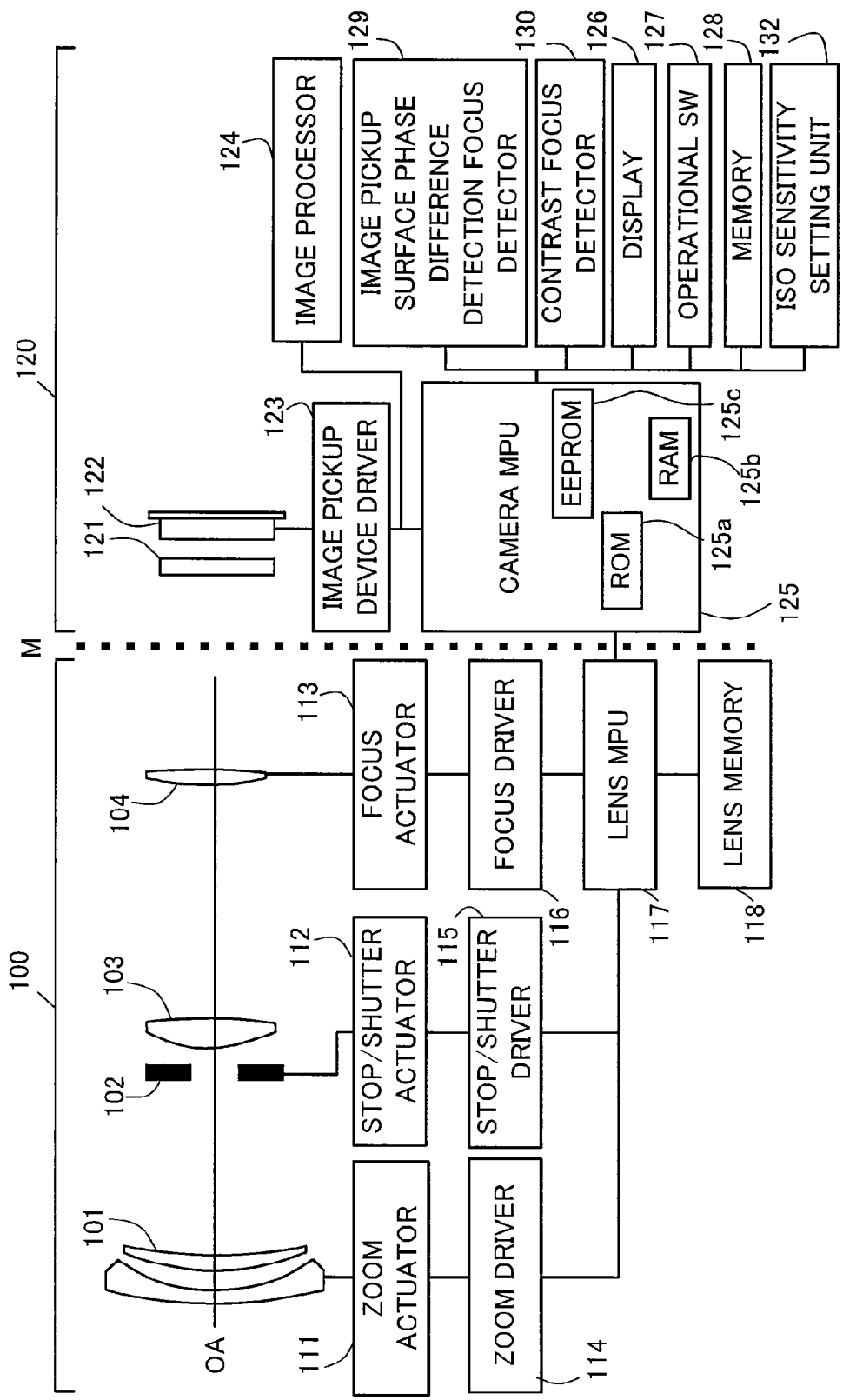
FIG. 1 is a block diagram of a digital camera (image pickup apparatus) according to this embodiment.

FIG. 1 is a block diagram of a digital camera (image pickup apparatus) according to this embodiment. The digital camera according to this embodiment is an exchange lens type single-lens reflex camera, and includes a lens unit 100 and a camera body 120. The lens unit 100 is connected to the camera body 120 via a mount M shown by a center dotted line in FIG. 1.

The lens unit 100 includes a first lens unit 101, a stop/shutter 102, a second lens unit 103, a focus lens unit (simply referred to as a "focus lens" hereinafter) 104, and a drive/control system. Thus, the lens unit 100 has an image pickup lens that includes the focus lens 104 and is configured to form an image of an object.

The first lens unit 101 is arranged at a top of the lens unit 100, and is held movable back and forth along an optical axis direction OA. The stop/shutter 102 is configured to adjust a light amount at the image pickup time by adjusting its aperture diameter as well as serving as an exposure time adjustment shutter at the still image pickup time. The stop/shutter 102 and the second lens unit 103 together move back and forth along the optical axis direction OA, and provide a zoom function in association with back and forth movements of the first lens unit 101. The focus lens 104 provides autofocusing by moving back and forth along the optical axis direction OA.

The drive/control system includes a zoom actuator 111, a stop/shutter actuator 112, a focus actuator 113, a zoom driver 114, a stop/shutter driver 115, a focus driver 116, a lens MPU 117, and a lens memory 118.

The zoom actuator 111 moves the first lens unit 101 and the third lens unit 103 back and forth in the optical axis direction OA for zooming operations. The stop/shutter actuator 112 controls an aperture diameter of the stop/shutter 102, adjusts the image pickup light amount, and controls an exposure time period at the still image pickup time.

The focus actuator 113 provides autofocusing by moving the focus lens 104 back and forth along the optical axis direction OA. The focus actuator 113 serves as a position detector configured to detect a current position of the focus lens 104.

The zoom driver 114 drives the zoom actuator 111 in accordance with the zoom operation of a photographer. The stop/shutter driver 115 controls an aperture of the stop/shutter 102 by controlling driving of the stop/shutter actuator 112.

The focus driver 116 controls driving of the focus actuator 113 based on a focus detection result, and moves the focus lens 104 back and forth in the optical axis direction OA for autofocusing.

The lens MPU 117 provides all operations and controls relating to the image pickup lens, and controls the zoom driver 114, the stop/shutter driver 115, the focus driver 116, and the lens memory 118. In addition, the lens MPU 117 detects the current lens position, and informs the lens position information in response to a request from the camera MPU 125. The lens memory 118 stores optical information necessary for autofocusing.

The camera body 120 includes an optical low-pass filter 121, an image pickup device 122, and a drive/control system.

The low-pass filter 121 and the image pickup device 122 serve as an image pickup optical system configured to form an object image using light from the lens unit 100.

The optical low-pass filter 121 mitigates a false color and moiré of a captured image.

The image pickup device 122 includes a C-MOS sensor and its peripheral circuit, in which one photoelectric conversion element is arranged on a light receiving pixel having "m" pixels in the lateral direction and "n" pixels in the longitudinal direction. The image pickup device 122 is configured so that all pixels can independently provide outputs. Some of the pixels are assigned to focus detection pixels each configured to provide a focus detection of a phase difference detection method on an image pickup surface ("image pickup surface phase difference AF").

More specifically, the image pickup device 122 includes a plurality of image pickup pixels each configured to receive light that has passed a whole area of an exit pupil of an image pickup lens configured to form an image of an object. The image pickup device 122 further includes a plurality of focus detection pixels each configure to receive light that has passed a part of an area of the exit pupil of the image pickup lens. The plurality of focus detection pixels can wholly receive light that has passed the whole area of the exit pupil of the image pickup lens. For example, in two column times two rows of pixels in the image pickup device 122, a pair of diagonal G pixels is left as image pickup pixels and the R pixel and the B pixel are replaced with the focus detection pixels.

The drive/control system includes an image pickup device driver 123, an image processor 124, a camera MPU 125, a display 126, operational switches (SW) 127, a memory 128, an image pickup surface phase difference detection focus detector ("IPF") 129, a contrast focus detector 130, and an ISO sensitivity setting unit 132.

The image pickup device driver 123 controls an operation the image pickup device 122, provides an analogue-to-digital conversion to an obtained image signal, and sends a resultant signal to the camera MPU 125. The image processor 124 provides a variety of processes, such as a Y conversion, a color interpolation, and a JPEG compression, to an image obtained by the image pickup device 122.

The camera MPU (controller or processor) 125 provides all operations and controls relating to the camera body 120. The camera MPU 125 controls the image pickup device driver 123, the image processor 124, the display 126, the operational SW 127, the memory 128, the IPF 129, and the contrast focus detector 130.

The camera MPU 125 is connected to the lens MPU 117 via a signal line of the mount M, and requests the lens MPU 117 to obtain a lens position, to drive a lens at a predetermined driving amount, and to obtain optical information peculiar to the lens unit 100. When a lens having a large image magnification change is mounted, the camera MPU 125 can obtain information of the lens from the lens MPU 117. The camera MPU 125 includes a ROM 125a configured to store a program used to control a camera operation, a RAM 125b configured to store variables, and an EEPROM 125c configured to store a variety of parameters.

Figure 2:
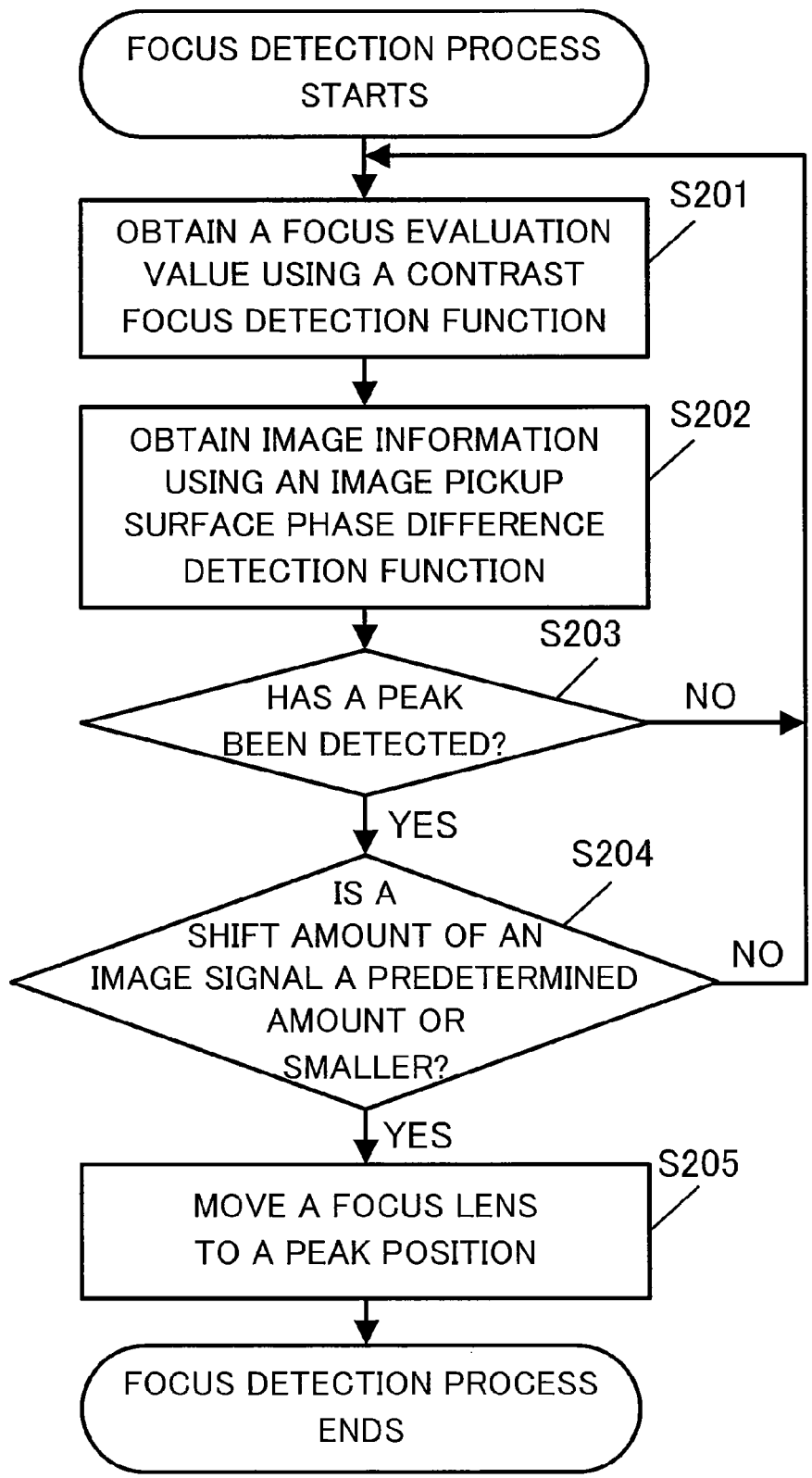
FIG. 2 is a flowchart for explaining a focus detection process executed by a camera MPU in the digital camera shown in FIG. 1.

Moreover, the camera MPU 125 executes a focus detection process shown in FIG. 2 using a program stored in the ROM 125a. More specifically, the camera MPU 125 determines, based on a shift amount (image information) of the image pickup surface phase difference AF, whether a peak position detected by the contrast focus detector 130 is a correct on-focus position or a false peak.

The display 126 includes an LCD, and is configured to display information relating to an image pickup mode of the camera, a preview image before image pickup, a confirmation image after image pickup, and an on-focus status display image at the focus detection time.

The operational switches 127 include a power switch, a release (image pickup trigger) switch, a zoom operation switch, an image pickup mode selection switch, etc. The memory 128 is a detachable flash memory configured to store a captured image.

The IPF (first focus detector) 129 performs a focus detection process of a phase difference AF method utilizing an image signal of focus detection pixels embedded in the image pickup device 122. More specifically, the IPF 129 provides the image pickup surface phase difference AF based on a pair of image shift amounts formed by the focus detection pixels using light fluxes that has passed a pair of pupil areas of the image pickup optical system. The principle of the image pickup surface phase difference AF is similar to that described in JP 2009-003122 and its FIGS. 5-7 and 16.

The contrast focus detector (second focus detector) 130 provides the contrast AF utilizing a contrast component of the image information obtained by the image processor 124. The contrast AF moves the focus lens 104 using a focus detection region that defines a region in which a focus is detected and a so-called mountain climbing method, and detects a position of the focus lens 104 which provides a peak of the contrast value.

As described above, when the lens having a large image magnification change is attached, the camera MPU 125 can obtain information of the lens from the lens MPU 117. The camera MPU 125 communicates with the contrast focus detector 130, and can determine whether the focus detection region is larger than a predetermined region. The predetermined region is stored in the EEPROM 125c.

The ISO sensitivity setting unit 132 sets ISO 50 to ISO 3200.

Thus, this embodiment utilizes a hybrid focus detector that combines the image pickup surface phase difference AF with the contrast AF. This embodiment quickly moves the focus lens 104 to a position near the on-focus position, and then precisely positions the focus lens 104 at the on-focus position, thereby compromising the responsiveness with the focus detection accuracy. The image pickup surface phase difference AF may detect an on-focus position by mistake when the object has a repetitive pattern, but the contrast AF can prevent this erroneous detection. In addition, this embodiment improves the on-focus position detecting accuracy when the contrast AF detects a peak, as described later.

Referring now to FIG. 2, a description will be given of a focus detection process executed by the camera MPU (processor) 125. In FIG. 2, "S" denotes an abbreviation of the step. FIG. 2 is a flowchart for explaining the focus detection process executed by the camera MPU 125, and stored in the ROM 125a.

The camera MPU 125 starts the focus detection process when the user manipulates the operational SW 127. Initially, the camera MPU 125 performs a focus detection process utilizing the image pickup surface phase difference AF, and determines whether it detects a defocus amount. The camera MPU 125 continues the image pickup surface phase difference AF until it detects the defocus amount. When determining that it detects the defocus amount, the camera MPU 125 performs a necessary correction for an image signal, and then moves the focus lens 104 to a position near the on-focus position. Thereafter, the camera MPU 125 moves the focus lens 104 from that position in an on-focus position existing direction and starts the contrast AF. A driving interval of the contrast AF has been previously stored in the EEPROM 125c.

Next, the camera MPU 125 obtains a focus evaluation value for a focus detection region (not shown) set by the contrast focus detector 130 (S201). In addition, the camera MPU 125 obtains image information corresponding to the set focus detection region (not shown) from the IPF 129 (S202). The order of S201 and S202 is arbitrary, and the values obtained in S201 and S202 are temporarily stored in the RAM 125*b*. Thus, this embodiment executes the contrast AF in synchronization with the image pickup surface phase difference AF even after the image pickup surface phase difference AF has transferred to the contrast AF.

Next, the camera MPU 125 determines whether a peak has been detected or whether an evaluation value of the contrast AF changes from an increase to a decrease and the decrease amount reaches a peak determination threshold that has been previously stored in the EEPROM 125*c* (S203). When the camera MPU 125 determines that the peak has not yet been detected (NO of S203), the flow returns to S201.

On the other hand, when the camera MPU 125 determines that the peak has been detected (YES of S203), the camera MPU 125 operates a shift amount between two images from image information obtained in S202, and determines whether the shift amount is a predetermined value or smaller (S204). The predetermined value (threshold) has been previously stored in the EEPROM 125*c*. When determining that the shift amount is larger than the predetermined value (NO of S204), the camera MPU 125 regards the peak of the contrast value detected in S203 as a false peak and the flow returns to S201.

According to the conventional contrast AF, subsequent to S201 to S203, S205 follows YES of S203. On the other hand, this embodiment performs S202 and S204, because S204 improves the focus detection accuracy of the contrast AF.

On the other hand, when determining that the shift amount is the predetermined value or smaller (YES of S204), the camera MPU 125 moves the focus lens 104 to the peak position (S205) since it is likely that the current position is close to the on-focus position and the peak detected in S203 is the on-focus position. At this time, the driving interval of the focus lens 104 may be narrowed.

The camera MPU 125 allows both the focus detectors 129 and 130 to continue the focus detections when the shift amount detected by the IPF 129 is larger than the threshold, even when the contrast focus detector 130 detects the peak position. This is because the peak position detected in S203 is likely to be a false peak. On the other hand, the camera MPU 125 moves the focus lens 104 of the image pickup lens to the peak position detected in S203 when the contrast focus detector 130 detects the peak position and when the shift amount detected by the IPF 129 is the threshold or smaller. The camera MPU 125 provides a first mode in which the camera MPU 125 controls both the focus detectors 129 and 130.

The camera MPU 125 may execute a focus detection method shown in FIG. 2 (first mode) when determining that the ISO sensitivity setting unit 132 sets a high ISO sensitivity equal to or higher than a predetermine value, such as ISO 800 or higher. The camera MPU 125 may perform a usual contrast AF (second mode) in which S202 and S204 are removed from FIG. 2 when determining that it is not the case. The predetermined value is previously stored in the EEPROM 125*c*.

The second mode is performed when the camera MPU 125 determines that the ISO sensitivity setting unit 132 sets the ISO sensitivity smaller than the predetermined value. In this case, when the contrast focus detector 130 detects the peak position, the camera MPU 125 controls the contrast focus detector 130 so that the focus lens 104 can be moved to the peak position. In the second mode, the camera MPU 125 stops the IPF 129 or ignores information from the IPF 129.

In addition, the camera MPU 125 communicates with the lens MPU 117, and may perform the first mode when determining that the focus detection region (not shown) is larger than the predetermined region and the second mode when determining that the focus detection region is equal to or smaller than the predetermined region. The predetermined region has been previously stored in the EEPROM 125*c*.

The image pickup apparatus is applicable to photography of an object.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-136313, filed Jun. 5, 2009 which is hereby incorporated by reference herein in its entirety.

What is claimed is:

1. An image pickup apparatus comprising:
    an image pickup device;
    a first focus detector configured to detect a shift amount between a pair of images of an object from an output signal output by the image pickup device;
    a second focus detector configured to detect a peak of a contrast value of the image of the object from the output signal output by the image pickup device; and
    a controller configured to move an image pickup lens to a lens position corresponding to a peak of the contrast value detected by the second focus detector,
    wherein, in case that the shift amount detected by the first focus detector is larger than a threshold at a lens position corresponding to a first peak of the contrast value detected by the second focus detector, the controller does not move the image pickup lens to the lens position corresponding to the first peak of the contrast value.

2. The image pickup apparatus according to claim 1, wherein, in case that the shift amount detected by the first focus detector is larger than a threshold at a lens position corresponding to a first peak of the contrast value detected by the second focus detector, the controller does not move the image pickup lens to the lens position corresponding to the first peak of the contrast value, and the second focus detector continues to detect another peak of the contrast value, and
    wherein, in case that the shift amount detected by the first focus detector is equal to or smaller than the threshold at a lens position corresponding to a second peak of the contrast value detected by the second focus detector, the controller moves the image pickup lens to the lens position corresponding to the second peak of the contrast value.

3. An image pickup apparatus comprising:
    an image pickup device;
    a first focus detector configured to detect a shift amount between a pair of images of an object from an image pickup signal obtained by an image pickup surface of the image pickup device;
    a second focus detector configured to detect a peak of a contrast value of the image of the object from the image pickup signal obtained by the same image pickup surface of the image pickup device; and
    a controller configured to move an image pickup lens to a lens position corresponding to the peak of the contrast value detected by the second focus detector,
    wherein, in case that the shift amount detected by the first focus detector is larger than a threshold at a lens position corresponding to a first peak of the contrast value detected by the second focus detector, the controller does not move the image pickup lens to the lens position corresponding to the first peak of the contrast value.

4. The image pickup apparatus according to claim 3, wherein, in case that the shift amount detected by the first focus detector is larger than a threshold at a lens position corresponding to a first peak of the contrast value detected by the second focus detector, the controller does not move the image pickup lens to the lens position corresponding to the first peak of the contrast value, and the second focus detector continues to detect another peak of the contrast value, and wherein, in case that the shift amount detected by the first focus detector is equal to or smaller than the threshold at a lens position corresponding to a second peak of the contrast value detected by the second focus detector, the controller moves the image pickup lens to the lens position corresponding to the second peak of the contrast value.

5. An auto focusing method in an image pickup apparatus that includes an image pickup device, the auto focusing method comprising:

a first detecting step of detecting a shift amount between a pair of images of an object from an output signal output by the image pickup device;

a second detecting step of detecting a peak of a contrast value of the image of the object from the output signal output by the image pickup device;

a controlling step of controlling not to move the image pickup lens to a lens position corresponding to a first peak of the contrast value detected by the second detecting step in case that the shift amount detected by the first detecting step is larger than a threshold at the lens position corresponding to the first peak of the contrast value.

6. An auto focusing method in an image pickup apparatus that includes an image pickup device, the auto focusing method comprising:

a first detecting step of detecting a shift amount between a pair of images of an object from an image pickup signal obtained by an image pickup surface of the image pickup device;

a second detecting step of detecting a peak of a contrast value of the image of the object from the image pickup signal obtained by the same image pickup surface of the image pickup device;

a controlling step of controlling not to move the image pickup lens to a lens position corresponding to a first peak of the contrast value detected by the second detecting step in case that the shift amount detected by the first detecting step is larger than a threshold at the lens position corresponding to the first peak of the contrast value.

* * * * *